United States Patent [19]
Noorlander

[11] Patent Number: 6,108,964
[45] Date of Patent: Aug. 29, 2000

[54] FISHING LURE

[76] Inventor: Steven J. Noorlander, 7012 NE. 142nd Ct., Vancouver, Wash. 98682

[21] Appl. No.: 09/200,982
[22] Filed: Nov. 30, 1998
[51] Int. Cl.⁷ .................................................. A01K 85/00
[52] U.S. Cl. ............................................ 43/42.5; D22/129
[58] Field of Search ................. 43/42.5, 42.51, 43/42.52; D22/129

[56]      References Cited

U.S. PATENT DOCUMENTS

| D. 140,513 | 3/1945 | May ........................... D22/129 |
| D. 154,098 | 6/1949 | Carr ........................... 43/42.51 |
| D. 174,420 | 4/1955 | Ferguson ..................... D22/129 |
| D. 381,061 | 7/1997 | Graham ....................... D22/129 |
| 1,770,003 | 7/1930 | Miller ......................... 43/42.5 |
| 1,978,843 | 10/1934 | Jensen ........................ 43/42.5 |
| 2,180,918 | 11/1939 | Verzi .......................... 43/42.52 |
| 2,264,211 | 11/1941 | Chance ....................... 43/42.5 |
| 2,380,328 | 7/1945 | Pecher ........................ 43/42.5 |
| 2,538,703 | 1/1951 | Perry .......................... 43/42.5 |
| 2,539,691 | 1/1951 | Erickson ..................... 43/42.5 |
| 2,557,599 | 6/1951 | Dunmire ..................... 43/42.52 |
| 2,575,609 | 11/1951 | Alderman ................... D22/129 |
| 2,588,300 | 3/1952 | Smith ......................... D22/129 |
| 2,698,494 | 1/1955 | Larsen ........................ D22/129 |
| 2,889,657 | 6/1959 | Bowman ..................... D22/129 |
| 2,908,104 | 10/1959 | Hutchins et al. ............ D22/129 |
| 3,021,636 | 2/1962 | Gowdy ....................... 43/42.51 |
| 3,229,407 | 1/1966 | Quyle ......................... D22/129 |
| 3,564,748 | 2/1971 | Malecki ...................... D22/129 |
| 3,673,727 | 7/1972 | Bauer ......................... 43/42.51 |
| 3,786,587 | 1/1974 | Niileksela ................... 43/35 |
| 3,919,802 | 11/1975 | Davis ......................... 43/42.5 |
| 4,041,636 | 8/1977 | Folker ........................ 43/42.51 |
| 4,142,318 | 3/1979 | Morrell ....................... 43/42.23 |
| 4,174,584 | 11/1979 | Howard ...................... 43/42.5 |
| 4,479,323 | 10/1984 | Burr ........................... 43/42.5 |
| 4,510,710 | 4/1985 | Hanna et al. ............... 43/42.51 |
| 4,594,806 | 6/1986 | Brown ........................ 43/42.5 |
| 4,819,362 | 4/1989 | Lewis ......................... 43/42.51 |
| 4,823,495 | 4/1989 | Camilleri .................... 43/43.13 |
| 4,854,071 | 8/1989 | Kendall ...................... 43/42.33 |
| 5,327,670 | 7/1994 | Tallerico .................... 43/42.14 |
| 5,400,542 | 3/1995 | Johnson ...................... 43/42.06 |
| 5,970,648 | 10/1999 | DeRose ...................... 43/42.51 |

FOREIGN PATENT DOCUMENTS

1242322   9/1988   Canada ................................ 43/42.5

Primary Examiner—Michael J. Carone
Assistant Examiner—Darren W. Ark
Attorney, Agent, or Firm—Richard C. Litman

[57]           ABSTRACT

A fishing lure having a body of a sheet material of uniform thickness. The body may be light reflective. The body has an ogive front portion and a triangular rear portion. A pair of wings extend from either side of the rear portion. The wings have rearward swept leading edges and rounded tips and trailing edges. The trailing edges of the wings meet to form a notch at the center of the rear edge of the body. The body has seven bends which give the front portion a faceted appearance and a generally downward angle, while giving the wings a compound generally upward angle. The various bends in the body cause the body to experience oscillating pitching and yawing movements combined with a side to side darting motion which simulate the movements of a swimming bait fish.

19 Claims, 3 Drawing Sheets

FISHING LURE

BACKGROUND OF THE INVENTION

1. Field of the Invention

The present invention relates to an artificial fishing lure and a hydrodynamically movable body which forms a part of such a lure.

2. Description of the Related Art

Artificial lures are commonly used for catching game fish. The lures generally entice the game fish into striking the lure by either mimicking the movements of fish the game fish normally feed on (these fish are known as bait or food fish) or by simulating the light reflections from the bodies of the bait fish. The following are examples of artificial lures that have been proposed in the art.

U.S. Pat. No. 3,786,587, issued to Eino Ilmari Niileksela on Jan. 22, 1974, shows a mechanism for deploying hooks hidden in an artificial lure body.

U.S. Pat. No. 3,919,802, issued to Lester M. Davis on Nov. 18, 1975, shows a light reflective, corrugated lure body which is bent in opposite directions at its ends.

U.S. Pat. No. 4,041,636, issued to John F. Folker on Aug. 16, 1977, shows a light reflective body which is designed to spin as it is drawn through the water.

U.S. Pat. No. 4,142,318, issued to Francis E. Morrell on Mar. 6, 1979, shows a fishing lure having an elongated body which has laterally extending, curved planes at each of its ends. The lure of Morrell is designed to wobble or spin depending upon the attachment point of the fishing line.

U.S. Pat. No. 4,174,584, issued to Charles R. Howard on Nov. 20, 1979, shows a fishing lure having an elongated body in the for of a twisted strip to impart spin to the lure.

U.S. Pat. No. 4,479,323, issued to Roland E. Burr on Oct. 30, 1984, shows a fishing lure having an elongated body with a sloping step in the middle thereof. The sloping step portion imparts a side to side motion to the lure.

U.S. Pat. No. 4,594,806, issued to John L. Brown on Jun. 17, 1986, shows a fishing lure having a body shaped to provided a side to side movement. The lure has a curved body with laterally extending fins. The trailing edges of the fins are turned upward.

U.S. Pat. No. 4,823,495, issued to Jonathan P. Camilleri on Apr. 25, 1989, shows a flat elongated body, which is bent into an S-shape when viewed from the side, for imparting side to side motion to a fishing line.

U.S. Pat. No. 4,854,071, issued to Jay Kendall on Aug. 8, 1989, shows a spoon type lure made of translucent plastic.

U.S. Pat. No. 5,327,670, issued to Roy D. Tallerico on Jul. 12, 1994, shows a lure having multiple spinners.

U.S. Pat. No. 5,400,542, issued to Willie C. Johnson on Mar. 28, 1995, shows a lure having a light reflective spinner.

None of the above referenced inventions and patents teach or suggest the unique configuration of the hydrodynamically movable body of the lure of the present invention. Thus, none of the above inventions and patents, taken either singularly or in combination, is seen to describe the instant invention as claimed.

SUMMARY OF THE INVENTION

The present invention is directed to a fishing lure having a body of a sheet material of uniform thickness. The body may be light reflective. The body has an ogive front portion and a triangular rear portion. a pair of wings extend from either side of the rear portion. The wings have rearward swept leading edges and rounded tips and trailing edges. The trailing edges of the wings meet to form a notch at the center of the rear edge of the body. The body has seven bends which give the front portion a faceted appearance and a generally downward angle, while giving the wings a compound generally upward angle. The various bends in the body cause the body to experience oscillating pitching and yawing movements combined with a side to side darting motion which simulate the movements of a swimming bait fish.

Accordingly, it is a principal object of the invention to provided an artificial lure that attracts game fish by simulating the movements of bait fish.

It is another object of the invention to provide a lure that executes side to side darting, pitching, and yawing movements without spinning.

It is a further object of the invention to provide an artificial lure that is light reflective to attract salmon, trout, and the like.

Still another object of the invention is to provide a hydrodynamically movable body for an artificial lure with a basic characteristic planform and angled surfaces such that the dimensions and relative proportions of the basic characteristic planform, and the angles between the body's surfaces, can be varied to optimize the lure for various game fish species and varying water conditions.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Referring to FIGS. 1–6, the present invention is a fishing lure 10 which includes a body 12, a first barrel swivel 14, a second barrel swivel 16, and a hook 18. The body 12 may be light reflective, light reflective with various painted regions, or completely painted in a variety of colors. The choice of the color scheme would depend upon the species of fish that is intended to be caught by the lure 10. The size of the body 12 also varies depending upon the type of fish that is to be caught. For catching salmon and trout, for example, a light reflecting or shiny finish is preferred. This type of finish is generally obtained by making the body 12 out of a metal such as brass, copper, or stainless steel which is highly polished. Alternatively, the metal body, such as a brass or copper body, can be plated with nickel-chrome, silver, or gold to achieve the desired lustre and color.

The body 12 is constructed of a sheet of essentially rigid material. By essentially rigid is meant any material with sufficient mechanical strength to maintain its shape when subjected to the mechanical and hydrodynamic stresses and strains that the lure 10 would be subjected to during use. As already stated, a sheet of a metal such as brass, copper, or stainless steel may be used in the construction of the body 12. Although a sheet of rigid dense plastic may also be used in the construction of the body 12, sheet-metals are preferred because the metals higher density provides for better casting properties and better retrieving or trolling depth control. Preferably, the body 12 is made out of a sheet of metal such as brass with a thickness in the range of 0.024 to 0.032 inch. For salmon fishing, for example, the sheet of metal would be polished to produce mirror-like reflections. The body 12 can be fabricated by stamping, pressing in a die, or by hammering.

Figures 1, 2:
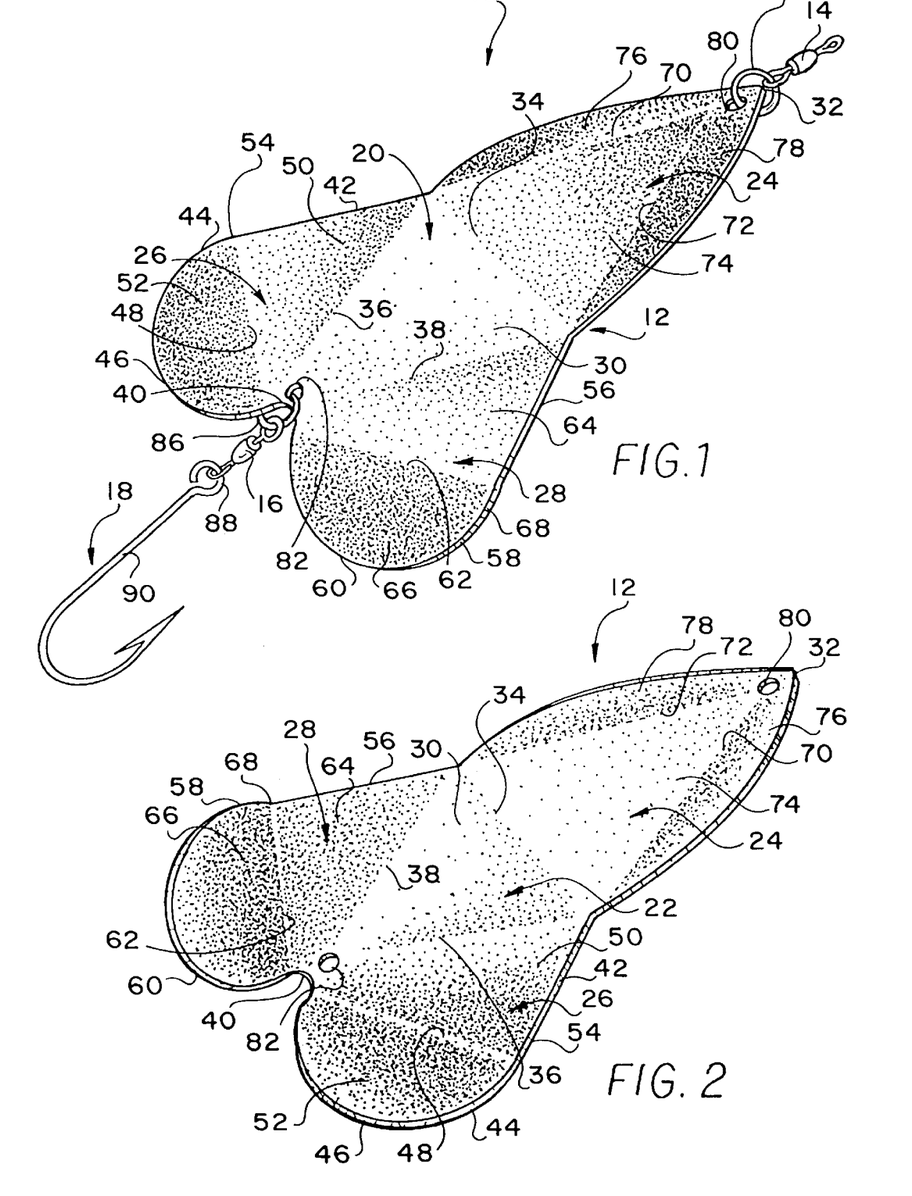
FIG. 1 is a perspective view of the ventral side of a fishing lure according to the present invention.
FIG. 2 is a perspective view of the dorsal side of a hydrodynamically movable body of a fishing lure according to the present invention.
Figure 3:
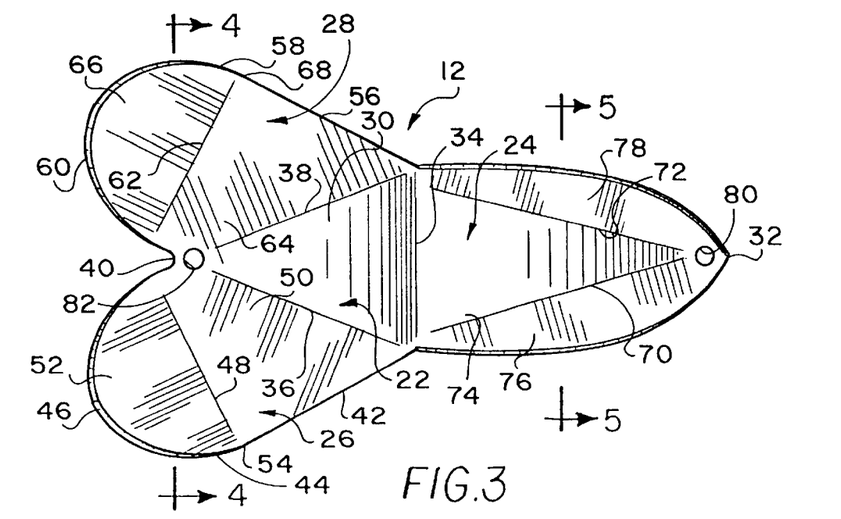
FIG. 3 is a top or dorsal plan view of the hydrodynamically movable body of a fishing lure according to the present invention.
Figure 4:
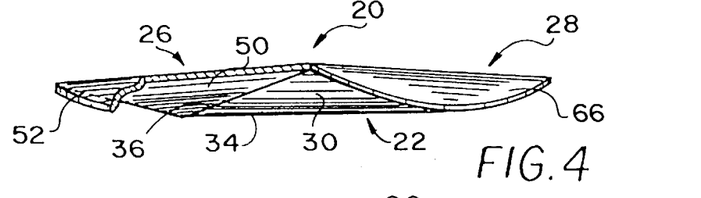
FIG. 4 is a cutaway rear view of the hydrodynamically movable body of a fishing lure according to the present invention, showing the angular relationship between the portions of the wings of the body.
Figure 5:
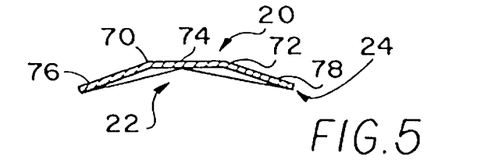
FIG. 5 is a cross sectional view of the ogive front portion of the hydrodynamically movable body of a fishing lure according to the present invention, taken along a plane transverse to the longitudinal axis of the hydrodynamically movable body.
Figure 6:
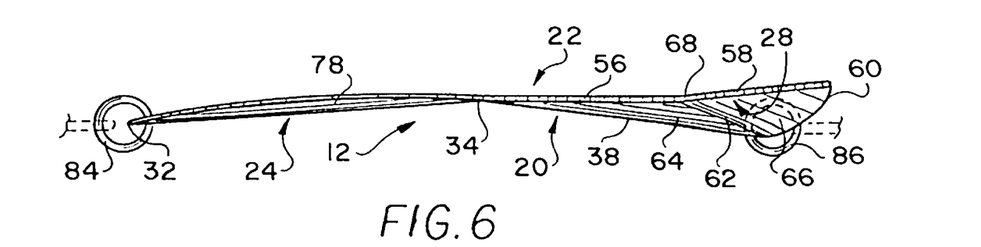
FIG. 6 is a side elevational view of the hydrodynamically movable body of a fishing lure according to the present invention.

The body 12 has a ventral side 20 and dorsal side 22. When laid on a horizontal surface with its ventral side down, the body 12 will have a characteristic planform when viewed from above the dorsal side 22 as shown in FIG. 3. Naturally, the same planform or outline would be observed if the body 12 was placed on a horizontal surface with its dorsal side down and viewed from above the ventral side 20.

The characteristic planform of the body 12 is formed by the planform or outline of a front body portion 24 and the planforms or outlines of a first wing 26 and a second wing 28. The body 12 itself is formed by a rear body portion 30 in addition to the front body portion 24, the first wing 26, and the second wing 28.

The front body portion 24 has a nose 32 and terminates at a rear edge 34 distal from the nose 32. The front body portion 24 has a planform that is inclusive of the nose 32 and extends from the nose 32 to the rear edge 34 of the front body portion 24. The front body portion 24 tapers or decreases in width toward the nose 32 for at least the forwardmost quarter of the front body portion 24. The front body portion 24 has a center line extending from the nose 32 to the rear edge 34 of the front body portion 24 and bisects the rear edge 34.

In the example illustrated in FIGS. 1–6 and 8, the front body portion has a substantially ogive or pointed arch planform. The terms "substantially ogive" as used herein are intended to allow for a rounding of the point of the ogive so as to avoid a hazardously sharp point.

The rear body portion 30 is substantially triangular and has a forward edge 34 and first and second lateral edges 36 and 38, respectively. The forward edge of the rear body portion 30 is coextensive with the rear edge of the front body portion 24, therefore the same reference numeral 34 is used to refer to both the forward edge of the rear body portion 30 and the rear edge of the front body portion 24. The terms "substantially triangular" as used herein are intended to take into account the fact the corners of the roughly triangular rear body portion 30 may deviate from the corners of a perfect triangle for several reasons. First, due to the inaccuracies inherent in the manufacturing process or by design, the edges 34, 36, and 38 may not extend far enough or be positioned precisely enough to define a perfect triangle. Further, the corners of triangular rear body portion 30 may deviate from a perfect triangle because of the presence of holes or notches, or the corners may be truncated or clipped. The aftmost terminus 40 of the rear body portion 30 forms approximately the apex of a triangle defined by the edges 34, 36, and 38.

The first wing 26 has a wing root 36, a leading edge 42, a wing tip 44, and a trailing edge 46. The wing root of the first wing 26 being coextensive with the first lateral edge of the rear body portion 30, the same reference numeral 36 is used to refer to both the first lateral edge of the rear body portion 30 and the wing root of the first wing 26. The first wing 26 has a first bend 48. The first bend 48 essentially divides the first wing 26 into a leading portion 50 and a first trailing flap portion 52. The first bend 48 causes the first trailing flap portion 52 to make an angle greater than one hundred and eighty degrees with the leading portion 50 of the first wing 26 when this angle is measured on the ventral side 20 of the body 12. The first wing 26 has a planform that is cooperatively formed by the leading edge 42, the wing tip 44, and a trailing edge 46.

The leading edge 42 of the first wing 26 is swept rearward and has a distal terminus 54 relative to the forward edge 34 of the rear body portion 30. The wing tip 44 of the first wing 26 and the trailing edge 46 of the first wing 26 form a first continuous curved wing rear edge extending from the distal terminus 54 of the leading edge 42 to approximately the aftmost terminus 40 of the rear body portion 30. The first bend 48 is formed along a line extending from approximately the aftmost terminus 40 of the rear body portion 30 to approximately the distal terminus 54 of the leading edge 42. The intersection of the line along which the first bend 48 is formed and the leading edge 42 of the first wing defines the distal terminus 54 and the forward limit of the wing tip 44. The first trailing flap portion 52 is defined essentially by the first bend 48 and the first continuous curved wing rear edge formed by the wing tip 44 and the trailing edge 46. The leading portion 50 is defined essentially by the first bend 48, the first lateral edge 36 of the rear body portion 30, and the leading edge 42 of the first wing 26.

The second wing 28 has a wing root 38, a leading edge 56, a wing tip 58, and a trailing edge 60. The wing root of the second wing 28 being coextensive with the second lateral edge of the rear body portion 30, the same reference numeral 38 is used to refer to both the second lateral edge of the rear body portion 30 and the wing root of the second wing 28. The second wing 28 has a second bend 62. The second bend 62 essentially divides the second wing 28 into a leading portion 64 and a second trailing flap portion 66. The second bend 62 causes the second trailing flap portion 66 to make an angle greater than one hundred and eighty degrees with the leading portion 64 of the second wing 28 when this angle is measured on the ventral side 20 of the body 12. The second wing 28 has a planform that is cooperatively formed by the leading edge 515, the wing tip 58, and a trailing edge 60.

The leading edge 56 of the second wing 28 is swept rearward and has a distal terminus 68 relative to the forward edge 34 of the rear body portion 30. The wing tip 58 of the second wing 28 and the trailing edge 60 of the second wing 28 form a second continuous curved wing rear edge extending from the distal terminus 68 of the leading edge 56 to approximately the aftmost terminus 40 of the rear body portion 30. The second bend 62 is formed along a line extending from approximately the aftmost terminus 40 of the rear body portion 30 to approximately the distal terminus 68 of the leading edge 56. The intersection of the line along which the second bend 62 is formed and the leading edge 56 of the second wing defines the distal terminus 68 and the forward limit of the wing tip 58. The second trailing flap portion 66 is defined essentially by the second bend 62 and the second continuous curved wing rear edge formed by the wing tip 58 and the trailing edge 60. The leading portion 64 is defined essentially by the second bend 62, the second lateral edge 38 of the rear body portion 30, and the leading edge 56 of the second wing 28.

The planform of the first wing 26, the planform of the second wing 28, and the planform of the front body portion 24 cooperatively substantially define the characteristic planform of the body 12. If the rear body portion 30, near its corners, deviates from a perfect triangle for the reasons previously stated, then the rear body portion 30 may also play a part in defining the characteristic planform of the body 12. Thus, in essence, the leading edge 42 of the first wing 26, the first continuous curved wing rear edge formed by the trailing edge 46 and the wing tip 44, the leading edge 56 of the second wing 28, the second continuous curved wing rear edge formed by the trailing edge 60 and the wing tip 58, and the substantially ogive planform of the front body portion 24 cooperatively define the characteristic planform of the body 12. The first and second trailing flap portions 52 and 66 extend rearward to the greatest extent than any other portion of the body 12 such that the trailing edges 46 and 60 essentially meet to form a notch at about the aftmost terminus 40.

The first trailing flap portion 52 and the second trailing flap portion 66 tend to impart a nose-up pitching moment to the body 12. The body 12 has a third bend approximately along the forward edge 34 of the rear body portion 30 such that the center line of the front body portion 24 makes an angle with the rear body portion 30 that is less than one hundred and eighty degrees when the angle is measured on the ventral side 20 of the body 12. Thus, the front body portion 24 tends to impart a nose-down pitching moment to the body 12. The forward edge of the rear body portion 30 and the rear edge of the front body portion 24 being roughly coextensive with the third bend, the same reference numeral 34 is used to refer to the forward edge of the rear body portion 30, the rear edge of the front body portion 24, and the third bend in order to avoid the confusion that would result if several different reference numerals had lead lines pointing to visually the same apparent structural feature in the illustrations.

In addition to the bends already discussed, the body 12 has a fourth bend 70, a fifth bend 72, a sixth bend 36, and a seventh bend 38. The fourth bend 70 extends from proximate allocation at which the forward edge 34 of the rear body portion 30 meets the leading edge 42 of the first wing 26 to a location proximate the nose 32. The fifth bend 72 extends from proximate a location at which the forward edge 34 of the rear body portion 30 meets the leading edge 56 of the second wing 28 to a location proximate the nose 32. The sixth bend extends approximately along the first lateral edge 36 of the rear body portion 30. The first lateral edge 36 of the rear body portion 30 being roughly coextensive with the sixth bend, the same reference numeral 36 is used to refer to the first lateral edge of the rear body portion 30 and the sixth bend in order to avoid the confusion that would result if several different reference numerals had lead lines pointing to visually the same apparent structural feature in the illustrations. The seventh bend 38 extends approximately along the second lateral edge of the rear body portion 30. Again, the second lateral edge 38 of the rear body portion 30 being roughly coextensive with the sixth bend, the same reference numeral 38 is used to refer to the second lateral edge of the rear body portion 30 and the seventh bend in order to avoid the confusion that would result if several different reference numerals had lead lines pointing to visually the same apparent structural feature in the illustrations.

The fourth and fifth bends 70 and 72 divide the front body portion 24 into a substantially triangular medial front body portion 74, a first lateral front body portion 76, and a second lateral front body portion 78. The fourth bend 70 delineates the first lateral front body portion 76 from the medial front body portion 74, and the fifth bend 72 delineates the second lateral front body portion 78 from the medial front body portion 74. The fourth bend 70 causes the first lateral front body portion 76 to make an angle greater than one hundred and eighty degrees with the medial front body portion 74 when the angle is measured on the ventral side 20 of the body 12. The fifth bend 72 causes the second lateral front body portion 78 to make an angle greater than one hundred and eighty degrees with the medial front body portion 74 when the angle is measured on the ventral side 20 of the body 12.

The sixth bend 36 causes the leading portion 50 of the first wing 26 to make an angle greater than one hundred and eighty degrees with the rear body portion 30 when the angle is measured on the ventral side 20 of the body 12. The seventh bend 38 causes the leading portion 64 of the second wing 28 to make an angle greater than one hundred and eighty degrees with the rear body portion 30 when the angle is measured on the ventral side 20 of the body 12.

Preferably, the first bend 48 causes the first trailing flap portion 52 to make an angle in the range of one hundred and eighty two to two hundred degrees with the leading portion 50 of the first wing 26 when the angle is measured on the ventral side 20 of the body 12. Preferably, the second bend 62 causes the second trailing flap portion 66 to make an angle in the range of one hundred and eighty two to two hundred degrees with the leading portion 64 of the second wing 28 when the angle is measured on the ventral side 20 of the body 12.

Preferably, the third bend 34 causes the center line of the front body portion 24 to make an angle in the range of one hundred and seventy eight to one hundred and sixty degrees with the rear body portion 30 when measured on the ventral side 20 of the body 12. Preferably, the fourth bend 70 causes the first lateral front body portion 76 to make an angle in the range of one hundred and eighty two to two hundred degrees with the medial front body portion 74 when measured on the ventral side 20 of the body 12. Preferably, the fifth bend 72 causes the second lateral front body portion 78 to make an angle in the range of one hundred and eighty two to two hundred degrees with the medial front body portion 74 when measured on the ventral side 20 of the body 12. Preferably, the sixth bend 36 causes the leading portion 50 of the first wing 26 to make an angle in the range of one hundred and eighty two to two hundred degrees with the rear body portion 30 when measured on the ventral side of the body 12, and the seventh bend 38 causes the leading portion 64 of the second wing 28 to make an angle in the range of one hundred and eighty two to two hundred degrees with the rear body portion 30 when measured on the ventral side of the body 12.

Even more preferably, the first bend 48 causes the first trailing flap portion 52 to make an angle in the range of one hundred and eighty four to one hundred and ninety five degrees with the leading portion 50 of the first wing 26 when measured on the ventral side of the body 12, and the second bend 62 causes the second trailing flap portion 66 to make an angle in the range of one hundred and eighty four to one hundred and ninety five degrees with the leading portion 64 of the second wing 28 when measured on the ventral side of the body 12. More preferably, the third bend 34 causes the center line of the front body portion 24 to make an angle in the range of one hundred and seventy six to one hundred and sixty five degrees with the rear body portion 30 when measured on the ventral side of the body 12. More preferably, the fourth bend 70 causes the first lateral front body portion 76 to make an angle in the range of one hundred and eighty four to one hundred and ninety five degrees with the medial front body portion 74 when measured on the ventral side of the body 12, and the fifth bend 72 causes the second lateral front body portion 78 to make an angle in the range of one hundred and eighty four to one hundred and ninety five degrees with the medial front body portion 74 when measured on the ventral side of the body 12. More preferably, the sixth bend 36 causes the leading portion 50 of the first wing 26 to make an angle in the range of one hundred and eighty four to one hundred and ninety five degrees with the rear body portion 30 when measured on the ventral side of the body 12, and the seventh bend 38 causes the leading portion 64 of the second wing 28 to make an angle in the range of one hundred and eighty four to one hundred and ninety five degrees with the rear body portion 30 when measured on the ventral side of the body 12. In a prototype embodiment useful for salmon fishing, the angles formed by the first, second, fourth, and fifth bends are about 190°. Also in the same prototype, the angles formed by the third, sixth, and seventh bends are about 170°, 187°, and 187°, respectively. All these angles are measured on the ventral side 20 of the body 12.

The front body portion 24 of the body 12 has a first hole 80 proximate the nose 32, and the body 12 has a second hole 82 proximate the aftmost terminus of the rear body portion 30. Rings 84 and 86 connect one end of the barrel swivels 14 and 16, respectively, to a respective one of the holes 80 and 82. The rings 84 and 86 are preferably of the type that resembles a key ring. In other words, each of the rings 84 and 86 is in the form of a pair of tightly wound resilient wire coils which overlap one another and are wound so tight that the coils abuttingly contact one another along the arc over which the coils overlap. By spreading the coils apart, the rings can be passed through the holes 80 and 82. This type of ring allows easy removal or attachment of the barrel swivels 14 and 16 to the holes 80 and 82.

The fish hook 18 is connected to the body 12 at the second hole 82 such that the fish hook 18 trails the body 12 as the body 12 is in forward motion relative to a fluid in which the body 12 is immersed. The second barrel swivel 16 is connected intermediate the fish hook 18 and the second hole 82 of the body 12. The eye 88 is interlocked with the eye of the barrel swivel 16 which is distal from the eye of the barrel swivel through which the ring 86 passes. This arrangement allows the fish hook 18 to rotate freely about the longitudinal axis of its shank 90 as the body 12 is in forward motion relative to the fluid in which the body 12 is immersed. The first barrel swivel 14 is connected to the body 12, via the ring 84, at the first hole 80. The eye, distal from the ring 84, of the barrel swivel 14 is used for the attachment of a fishing line 92 (shown in FIG. 8) in a manner well known in the art. The first barrel swivel 14 allows a fishing line to be attached to the fishing lure 10 while minimizing any interference due to the fishing line with rolling, pitching, and yawing movements of the body 12 within the fluid relative to which the body 12 is in forward motion.

The barrels swivels 14 and 16, the rings 84 and 86, the hook 18 and the manner of attachment of a fishing line to a lure are well known in the art and will not be described in detail here. In addition, although a single hook is shown in the illustrated examples, it is understood that double or treble hooks may also be used as part of the lure 10.

In use, a fishing line 92 is attached to the eye, distal from the ring 84, of the barrel swivel 14 in a manner well known in the art. The Lure 10 is then immersed in a liquid with respect to which the lure 10 is in motion. The liquid referred to herein will be the salt or fresh water of an ocean, a sea, a lake, a pond, a river, a stream, or the like. The lure 10 naturally tends to point into the current with its nose 32. Relative motion between the lure 10 and the fluid in which it is immersed can be created in many ways such as trolling the lure behind a boat, casting and retrieving the lure, or placing the lure in a fast flowing stream. The lure 10 rides the water current with the dorsal side 22 of the body 12 toward the surface of the water. As the water flows over the body 12, flowing from the nose 32 toward the trailing edges 46 and 60, the forces exerted by the flowing liquid on the surfaces of the body 12 cause the body 12 to experience oscillating pitching and yawing movements combined with a side to side darting or slaloming motion about a mean path. These movements occur while the dorsal side 22 of the body 12 continues to generally face up toward the water surface. Thus, the body 12 does not spin, unlike conventional lures. The combined movements of the body 12 simulate movements of a swimming bait item, such as a bait fish, and entice game fish into striking or biting at the lure 10.

Figure 8:
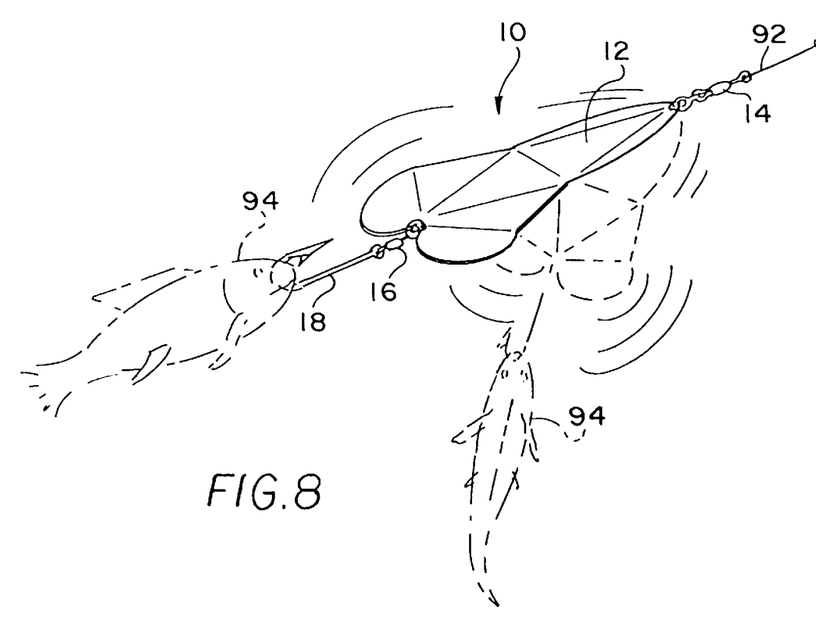
FIG. 8 is an environmental view of a fishing lure according to the present invention being used in conjunction with a bait fish.

Referring to FIG. 8, the lure 10 is shown used in combination with a natural bait fish 94 to troll for large game fish. The lure 10 may also be used with cut bait.

Figure 7:
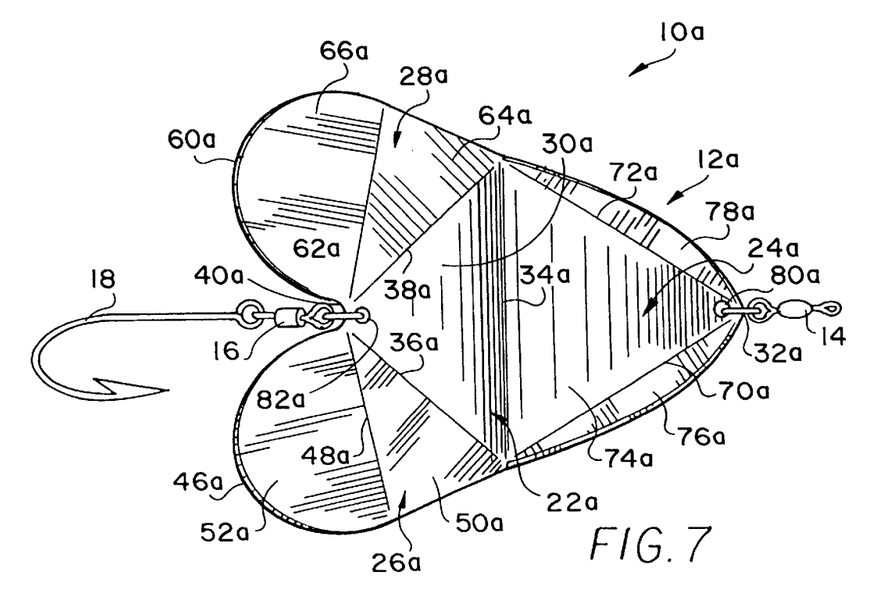
FIG. 7 is a top or dorsal plan view of the hydrodynamically movable body of an alternative embodiment of the fishing lure according to the present invention.

Referring to FIG. 7, the dorsal side 22a of an alternative embodiment 10a of the lure made in accordance with the present invention can be seen. The lure 10a includes a body 12a which has an ogive front body portion 24a, a triangular rear body portion 30a, a first wing 26a, and a second wing 28a The body 12a has the same basic planform and the same seven bends as the body 12. As with the body 12, the first bend 48a delineates the first trailing flap portion 52a from the leading portion 50a of the first wing 26a, and the second bend 62a delineates the second trailing flap portion 66a from the leading portion 64a of the second wing 28a. The third bend 34a causes the front body portion 24a to be angled downward relative to the rear body portion 30a. The fourth and fifth bends 70a and 72a divide the front body portion 24a into a substantially triangular medial front body portion 74a, a first lateral front body portion 76a, and a second lateral front body portion 78a. The sixth bend 36a and the seventh bend 38a cause the leading portions 50a and 64a of the wings 26a and 28a to be angled upward relative to the rear body portion 30a. The trailing edges 46a and 60a meet to form a notch 40a at the center of the rear edge of the body 12a.

The only difference between the lure 10a and the lure 10 is that the body 12a has a greater width to length ratio than the body 12. The greater width to length ratio tends to make the lure 10*a* less stable than the lure 10 and leads to the lure 10*a* having a more exaggerated side to side darting or slaloming movement which may make the lure 10*a* more attractive to some game fish species. The lure 10*a* illustrates how the basic planform of the lure made in accordance with the present invention may be varied to optimize the lure body planform for different game fish species and water conditions.

It is to be understood that the present invention is not limited to the embodiments described above, but encompasses any and all embodiments within the scope of the following claims.

I claim:

1. A fishing lure comprising:
    a body constructed of a sheet of essentially rigid material, said body having a ventral side and a dorsal side, said body having a characteristic planform when viewed from one of said ventral side and said dorsal side, said body being formed by:
        a front body portion having a nose and terminating at a rear edge distal from said nose, said front body portion having a planform inclusive of said nose and extending from said nose to said rear edge of said front body portion, said front body portion having a center line extending from said nose to said rear edge of said front body portion and bisecting said rear edge of said front body portion,
        a substantially triangular rear body portion having a forward edge and first and second lateral edges, said rear body portion further having an aftmost terminus, said forward edge of said rear body portion being coextensive with said rear edge of said front body portion,
        a first wing having a wing root and a leading edge, said wing root of said first wing being coextensive with said first lateral edge of said rear body portion, said first wing having a first bend, said first bend essentially dividing said first wing into a leading portion and a first trailing flap portion, said first bend causing said first trailing flap portion to make an angle greater than one hundred and eighty degrees with said leading portion of said first wing when measured on said ventral side of said body, said first wing having a first wing planform, and
        a second wing having a wing root and a leading edge, said wing root of said second wing being coextensive with said second lateral edge of said rear body portion, said second wing having a second bend, said second bend essentially dividing said second wing into a second trailing flap portion and a leading portion, said second bend causing said second trailing flap portion to make an angle greater than one hundred and eighty degrees with said leading portion of said second wing when measured on said ventral side of said body, said second wing having a second wing planform,
    said first wing planform, said second wing planform, and said planform of said front body portion cooperatively defining at least in part said characteristic planform of said body, said body having a third bend approximately along said forward edge of said rear body portion such that said center line of said front body portion makes an angle with said rear body portion that is less than one hundred and eighty degrees when measured on said ventral side of said body, whereby said body experiences oscillating pitching and yawing movements when placed in a fluid in relative motion with respect to said body to thereby simulate movements of a swimming bait item.

2. The fishing lure according to claim 1, wherein said first and second trailing flap portions extend rearward to the greatest extent than any other portion of said body.

3. The fishing lure according to claim 2, wherein said front body portion has a first hole proximate said nose, said body having a second hole proximate said aftmost terminus of said rear body portion.

4. The fishing lure according to claim 3 further comprising:
    fish hook connected to said body at said second hole, whereby said fish hook trails said body as said body is in forward motion relative to a fluid in which said body is immersed.

5. The fishing lure according to claim 4 further comprising:
    a first barrel swivel connected to said body at said first hole, whereby said first barrel swivel allows a fishing line to be attached to the fishing lure while minimizing any interference due to the fishing line with rolling, pitching, and yawing movements of said body within the fluid relative to which said body is in forward motion.

6. The fishing lure according to claim 5, wherein said fish hook has a shank and said shank has a longitudinal axis, the fishing lure further comprising:
    a second barrel swivel connected intermediate said fish hook and said second hole of said body, whereby said fish hook will be free to rotate about said longitudinal axis of said shank as said body is in forward motion relative to the fluid in which said body is immersed.

7. The fishing lure according to claim 1, wherein said front body portion has a first hole proximate said nose, said body having a second hole proximate said aftmost terminus of said rear body portion.

8. The fishing lure according to claim 7 further comprising:
    a fish hook connected to said body at said second hole, whereby said fish hook trails said body as said body is in forward motion relative to a fluid in which said body is immersed.

9. The fishing lure according to claim 8 further comprising:
    a first barrel swivel connected to said body at said first hole, whereby said first barrel swivel allows a fishing line to be attached to the fishing lure while minimizing any interference due to the fishing line with rolling, pitching, and yawing movements of said body within the fluid relative to which said body is in forward motion.

10. The fishing lure according to claim 9, wherein said fish hook has a shank and said shank has a longitudinal axis, the fishing lure further comprising:
    a second barrel swivel connected intermediate said fish hook and said second hole of said body, whereby said fish hook will be free to rotate about said longitudinal axis of said shank as said body is in forward motion relative to the fluid in which said body is immersed.

11. A fishing lure comprising:
    a light reflecting body constructed of a sheet of essentially rigid material, said body having a ventral side and a dorsal side, said body having a characteristic planform when viewed from one of said ventral side and said dorsal side, said body being formed by:
        a front body portion having a nose and terminating at a rear edge distal from said nose, said front body portion having a substantially ogive planform inclusive of said nose and extending from said nose to said rear edge of said front body portion, said front body portion having a center line extending from said nose to said rear edge of said front body portion and bisecting said rear edge of said front body portion, a substantially triangular rear body portion having a forward edge and first and second lateral edges, said rear body portion further having an aftmost terminus, said forward edge of said rear body portion being coextensive with said rear edge of said front body portion, a first wing having a wing root, a rearward swept leading edge, a wing tip, and a trailing edge, said wing root of said first wing being coextensive with said first lateral edge of said rear body portion, said leading edge of said first wing having a distal terminus located distally relative to said forward edge of said rear body portion, said wing tip of said first wing and said trailing edge of said first wing forming a first continuous curved wing rear edge extending from said distal terminus of said leading edge of said first wing to approximately said aftmost terminus of said rear body portion, said first wing having a first bend along a line extending from approximately said aftmost terminus of said rear body portion to approximately said distal terminus of said leading edge of said first wing, said first wing having a first trailing flap portion defined essentially by said first bend and said first continuous curved wing rear edge, said first wing having a leading portion defined essentially by said first bend, said first lateral edge of said rear body portion, and said leading edge of said first wing, said first bend causing said first trailing flap portion to make an angle greater than one hundred and eighty degrees with said leading portion of said first wing when measured on said ventral side of said body, and a second wing having a wing root, a rearward swept leading edge, a wing tip, and a trailing edge, said wing root of said second wing being coextensive with said second lateral edge of said rear body portion, said leading edge of said second wing having a distal terminus located distally relative to said forward edge of said rear body portion, said wing tip of said second wing and said trailing edge of said second wing forming a second continuous curved wing rear edge extending from said distal terminus of said leading edge of said second wing to approximately said aftmost terminus of said rear body portion, said second wing having a second bend along a line extending from approximately said aftmost terminus of said rear body portion to approximately said distal terminus of said leading edge of said second wing, said second wing having a second trailing flap portion defined essentially by said second bend and said second continuous curved wing rear edge, said second wing having a leading portion defined essentially by said second bend, said second lateral edge of said rear body portion, and said leading edge of said second wing, said second bend causing said second trailing flap portion to make an angle greater than one hundred and eighty degrees with said leading portion of said second wing when measured on said ventral side of said body, said leading edge of said first wing, said first continuous curved wing rear edge, said leading edge of said second wing, said second continuous curved wing rear edge, and said substantially ogive planform cooperatively defining said characteristic planform of said body, said first trailing flap portion and said second trailing flap portion tending to impart a nose-up pitching moment to said body, said body having a third bend approximately along said forward edge of said rear body portion such that said center line of said front body portion makes an angle with said rear body portion that is less than one hundred and eighty degrees when measured on said ventral side of said body thereby said front body portion tending to impart a nose-down pitching moment to said body, whereby said body experiences oscillating pitching and yawing movements when placed in a fluid in relative motion with respect to said body to thereby simulate movements of a swimming bait item.

12. The fishing lure according to claim 11, wherein said first and second trailing flap portions extend rearward to the greatest extent than any other portion of said body.

13. The fishing lure according to claim 12, wherein said front body portion has a first hole proximate said nose, said body having a second hole proximate said aftmost terminus of said rear body portion.

14. The fishing lure according to claim 13 further comprising:

a fish hook connected to said body at said second hole, whereby said fish hook trails said body as said body is in forward motion relative to a fluid in which said body is immersed.

15. The fishing lure according to claim 14 further comprising:

a first barrel swivel connected to said body at said first hole, whereby said first barrel swivel allows a fishing line to be attached to the fishing lure while minimizing any interference due to the fishing line with rolling, pitching, and yawing movements of said body within the fluid relative to which said body is in forward motion.

16. The fishing lure according to claim 15, wherein said fish hook has a shank and said shank has a longitudinal axis, the fishing lure further comprising:

a second barrel swivel connected intermediate said fish hook and said second hole of said body, whereby said fish hook will be free to rotate about said longitudinal axis of said shank as said body is in forward motion relative to the fluid in which said body is immersed.

17. The fishing lure according to claim 11, wherein said body further has a fourth, fifth, sixth, and seventh bends, said fourth bend extending from proximate a location at which said forward edge of said rear body portion meets said leading edge of said first wing to proximate said nose, said fifth bend extending from proximate a location at which said forward edge of said rear body portion meets said leading edge of said second wing to proximate said nose, said sixth bend extending approximately along said first lateral edge of said rear body portion, said seventh bend extending approximately along said second lateral edge of said rear body portion, said fourth and fifth bends dividing said front body portion into a substantially triangular medial front body portion, a first lateral front body portion, and a second lateral front body portion, said fourth bend delineating said first lateral front body portion from said medial front body portion, and said fifth bend delineating said second lateral front body portion from said medial front body portion, said fourth bend causing said first lateral front body portion to make an angle greater than one hundred and eighty degrees with said medial front body portion when measured on said ventral side of said body, said fifth bend causing said second lateral front body portion to make an angle greater than one hundred and eighty degrees with said medial front body portion when measured on said ventral side of said body, said sixth bend causing said leading portion of said first wing to make an angle greater than one hundred and eighty degrees with said rear body portion when measured on said ventral side of said body, said seventh bend causing said leading portion of said second wing to make an angle greater than one hundred and eighty degrees with said rear body portion when measured on said ventral side of said body.

18. The fishing lure according to claim 17, wherein said first bend causes said first trailing flap portion to make an angle in the range of one hundred and eighty two to two hundred degrees with said leading portion of said first wing when measured on said ventral side of said body, said second bend causes said second trailing flap portion to make an angle in the range of one hundred and eighty two to two hundred degrees with said leading portion of said second wing when measured on said ventral side of said body, said third bend causes said center line of said front body portion to make an angle in the range of one hundred and seventy eight to one hundred and sixty degrees with said rear body portion when measured on said ventral side of said body, said fourth bend causes said first lateral front body portion to make an angle in the range of one hundred and eighty two to two hundred degrees with said medial front body portion when measured on said ventral side of said body, said fifth bend causes said second lateral front body portion to make an angle in the range of one hundred and eighty two to two hundred degrees with said medial front body portion when measured on said ventral side of said body, said sixth bend causes said leading portion of said first wing to make an angle in the range of one hundred and eighty two to two hundred degrees with said rear body portion when measured on said ventral side of said body, and said seventh bend causes said leading portion of said second wing to make an angle in the range of one hundred and eighty two to two hundred degrees with said rear body portion when measured on said ventral side of said body.

19. The fishing lure according to claim 17, wherein said first bend causes said first trailing flap portion to make an angle in the range of one hundred and eighty four to one hundred and ninety five degrees with said leading portion of said first wing when measured on said ventral side of said body, said second bend causes said second trailing flap portion to make an angle in the range of one hundred and eighty four to one hundred and ninety five degrees with said leading portion of said second wing when measured on said ventral side of said body, said third bend causes said center line of said front body portion to make an angle in the range of one hundred and seventy six to one hundred and sixty five degrees with said rear body portion when measured on said ventral side of said body, said fourth bend causes said first lateral front body portion to make an angle in the range of one hundred and eighty four to one hundred and ninety five degrees with said medial front body portion when measured on said ventral side of said body, said fifth bend causes said second lateral front body portion to make an angle in the range of one hundred and eighty four to one hundred and ninety five degrees with said medial front body portion when measured on said ventral side of said body, said sixth bend causes said leading portion of said first wing to make an angle in the range of one hundred and eighty four to one hundred and ninety five degrees with said rear body portion when measured on said ventral side of said body, and said seventh bend causes said leading portion of said second wing to make an angle in the range of one hundred and eighty four to one hundred and ninety five degrees with said rear body portion when measured on said ventral side of said body.

* * * * *